(12) United States Patent
Vale et al.

(10) Patent No.: US 6,779,951 B1
(45) Date of Patent: Aug. 24, 2004

(54) DRILL INSERT USING A SANDWICHED POLYCRYSTALLINE DIAMOND COMPACT AND METHOD OF MAKING THE SAME

(75) Inventors: Roger Vale, Sandy, UT (US); David Miess, Highland, UT (US)

(73) Assignee: U.S. Synthetic Corporation, Orem, UT (US)

( * ) Notice: Subject to any disclaimer, the term of this patent is extended or adjusted under 35 U.S.C. 154(b) by 0 days.

(21) Appl. No.: 09/505,315

(22) Filed: Feb. 16, 2000

(51) Int. Cl.$^7$ .............................. B32B 7/02; B23B 27/14
(52) U.S. Cl. ........................ 407/119; 51/295; 428/698
(58) Field of Search ............................. 407/118, 119; 408/144, 145; 175/432, 433, 434, 435; 76/108.6, 108.1; 51/295, 293; 428/697, 698, 701

(56) References Cited

U.S. PATENT DOCUMENTS

| | | | |
|---|---|---|---|
| 3,767,371 A | * 10/1973 | Wentorf, Jr. et al. | 51/307 |
| 4,225,322 A | * 9/1980 | Knemeyer | 51/295 |
| 4,277,106 A | * 7/1981 | Sahley | 299/111 |
| 4,311,490 A | 1/1982 | Bovenkerk et al. | 51/307 |
| 4,527,643 A | 7/1985 | Horton et al. | 175/329 |
| 4,604,106 A | * 8/1986 | Hall et al. | 51/293 |
| 4,605,343 A | * 8/1986 | Hibbs et al. | 407/119 |
| 4,627,503 A | 12/1986 | Horton | 175/329 |
| 4,714,385 A | * 12/1987 | Komanduri | 407/119 |
| 4,772,294 A | * 9/1988 | Schroeder | 51/309 |
| 4,797,138 A | * 1/1989 | Komanduri | 51/293 |
| 4,797,326 A | 1/1989 | Csillag | 428/552 |
| 4,802,539 A | * 2/1989 | Hall et al. | 175/329 |
| 4,986,788 A | * 1/1991 | Jongin | 445/50 |
| 5,096,465 A | * 3/1992 | Chen et al. | 51/295 |
| 5,272,940 A | 12/1993 | Diskin | 76/108.6 |
| 5,304,342 A | 4/1994 | Hall, Jr. et al. | 419/11 |
| 5,370,195 A | * 12/1994 | Keshavan et al. | 175/420.2 |
| 5,492,188 A | * 2/1996 | Smith et al. | 175/432 |
| 5,554,415 A | 9/1996 | Turchan et al. | 427/248.1 |
| 5,603,070 A | * 2/1997 | Cerutti et al. | 419/6 |
| 5,620,754 A | 4/1997 | Turchan et al. | 427/554 |
| 5,643,641 A | 7/1997 | Turchan et al. | 427/595 |
| 5,648,127 A | 7/1997 | Turchan et al. | 427/596 |
| 5,650,059 A | 7/1997 | Shumaker et al. | 205/640 |
| 5,679,159 A | 10/1997 | Olson | 118/500 |
| 5,681,653 A | 10/1997 | Hammond et al. | 428/336 |
| 5,709,907 A | 1/1998 | Battaglia et al. | 427/126.1 |
| 5,722,803 A | 3/1998 | Battaglia et al. | 407/119 |
| 5,731,046 A | 3/1998 | Mistry et al. | 427/553 |
| 5,731,079 A | 3/1998 | Hammond et al. | 428/336 |
| 5,766,394 A | * 6/1998 | Anderson et al. | 156/89.11 |
| 5,773,140 A | * 6/1998 | Cerutti et al. | 428/332 |
| 5,871,850 A | * 2/1999 | Moriguchi et al. | 428/651 |
| 5,882,777 A | * 3/1999 | Kukino et al. | 428/216 |
| 5,934,842 A | 8/1999 | Gupta | 407/40 |
| 5,952,102 A | 9/1999 | Cutler | 428/408 |
| 6,086,959 A | * 7/2000 | Inspektor | 427/419 |
| 6,117,533 A | * 9/2000 | Inspektor | 428/216 |

* cited by examiner

Primary Examiner—Henry W. H. Tsai
(74) Attorney, Agent, or Firm—Lloyd W. Sadler

(57) ABSTRACT

A new drill insert product and the method of making the same are provided. This invention makes use of a multi-metal region bonded to the top (cutting) surface of a superabrasive layer to improve drill life, decrease the propensity for delamination and to avoid crack initiation sites in the drill insert product. This invention makes use of an inner can top composed essentially of niobium, which, under the compression pressure of an ultra high pressure press, bonds to a molybdenum disk, thereby providing improved tensile strength, abrasion resistance, bonding strength, as well as improved control over the cutting surface flatness. By using the inner can top, this invention improves process efficiency, while reducing manufacturing complexity and waste.

7 Claims, 2 Drawing Sheets

DRILL INSERT USING A SANDWICHED POLYCRYSTALLINE DIAMOND COMPACT AND METHOD OF MAKING THE SAME

BACKGROUND OF THE INVENTION

1. Field of the Invention

This invention relates to drill insert parts, which provide the cutting edge or surface of a twist drill bit. More particularly, this invention relates to drill insert parts having a cemented tungsten carbide or similar hard material substrate, a polycrystalline diamond layer and one or more layers of a multi-metal material, which is generally inserted in the tip of a standard twist drill bit to provide enhanced wear resistance.

2. Description of Related Art

A variety of polycrystalline diamond drill inserts for use in drill bits, machining tools and the like have been proposed. Typically, these inserts have certain improved material properties and may include alternative metals and/or tungsten carbide and a few make use of a polycrystalline diamond surface layer. However, such prior inserts do not incorporate a multi-metal strip or layer bonded to the top surface of the diamond, which is fixed to a tungsten carbide substrate.

For general background, the reader is directed to the following U.S. Patents, each of which is incorporated by referenced in its entirety for the material contained therein.

U.S. Pat. No. 4,311,490 describes a process for preparing a composite compact, wherein a mass of abrasive crystals, a mass of metal carbide, and a bonding medium are subjected to a high-temperature/high pressure process for providing a composite compact.

U.S. Pat. No. 4,527,643 describes a cutting element, which consists of five cutting edges, which are comprised of polycrystalline diamond or the like mounted to a central carbide substrate of or similar hard material held by a rotatable shaft, which can be inserted into a drilling machine.

U.S. Pat. No. 4,627,503 describes a polycrystalline (diamond) material and metal element for use as a cutting element for drilling holes or similar uses. The cutting element comprises a polycrystalline diamond or CBN center portion and at least one metal side portion. The metal side portion is made from a soft metal having a Young's Modulus less than approximately $45 \times 10^6$ psi and is selected from the group comprising cobalt, nickel, iron, copper, silver, gold, platinum, palladium and alloys of these metals and intermetallic compounds containing these metals.

U.S. Pat. No. 4,797,326 describes a process for fabricating a composite polycrystalline diamond or cubic boron nitride (CBN) compact.

U.S. Pat. No. 5,272,940 describes a rotary cutting tool that has a plurality of helical channels located in the body of the rotary cutting tool.

U.S. Pat. No. 5,304,342 describes a sintered product that is useful for abrasion- and impact-resistant tools and the like that comprises an iron-group metal binder and refractory metal carbide particles, e.g. tungsten carbide, formed in situ during sintering by the exothermic reaction of carbide-forming refractory metal powder with a carbon sourced mixed therewith.

U.S. Pat. No. 5,554,415 describes substrate coating techniques, including fabricating materials on a surface of a substrate where energy, such as from one or more lasers, is directed at the surface of a substrate to mobilize and vaporize a constituent element within the substrate.

U.S. Pat. No. 5,620,754 describes a method of treating and coating substrates that uses energy, such as from one or more lasers, directed at the surface of a substrate to mobilize and vaporize a constituent element within the substrate.

U.S. Pat. No. 5,643,641 describes a method of forming a diamond coating on a polymeric substrate that uses energy, such as from one or more lasers, directed at the surface of a substrate to mobilize and vaporize a constituent element within the substrate.

U.S. Pat. No. 5,648,127 describes a method of applying, sculpting, and texturing a coating on a substrate and for forming a heteroepitaxial coating on a surface of a substrate that uses energy, such as from one or more lasers, directed at the surface of a substrate to mobilize and vaporize a constituent element within the substrate.

U.S. Pat. No. 5,650,059 describes a method of making a cemented carbide substrate that includes preparing a binder to receive a cutting material such as a diamond coating.

U.S. Pat. No. 5,679,159 describes a mandrel for use in an arc-jet spinning diamond deposition process for coating cutting tool inserts.

U.S. Pat. No. 5,681,653 describes diamond-cutting tools, where single hard particles or single point cutting tools having the particles bonded thereto are coated with a modulated or layered composition of transition metal compounds or with titanium compounds to decrease mechanical failure of the particles.

U.S. Pat. No. 5,709,907 describes a method of producing a cutting tool that comprises a substrate, which has a roughened surface that presents a surface roughness of between 15 microinches and 125 microinches. A coating is applied to the roughed surface of the substrate by physical vapor deposition.

U.S. Pat. No. 5,722,803 describes a coated cutting tool and a method of producing the same, that comprises a substrate with a roughened surface and a coating applied to the roughened surface by physical vapor deposition.

U.S. Pat. No. 5,731,046 describes the fabrication of diamond and diamond-like carbon coatings that uses energy, such as from three different lasers, directed at the surface of a substrate to mobilize and vaporize a carbon constituent element within the substrate.

U.S. Pat. No. 5,731,079 describes diamond cutting tools having single hard particles or single point cutting tools having the particles bonded thereto are coated with a modulated or layered composition of transition metal compounds or with titanium compounds.

U.S. Pat. No. 5,934,842 describes a high-speed milling cutter that includes a hub rotatable about an axis, a plurality of radially extending arms, and a plurality of cutting inserts, each of which is connected to a distal portion of one of the arms.

U.S. Pat. No. 5,952,102 describes a diamond-coated tungsten carbide composite, which uses diamond layer coated on the substrate by a chemical vapor deposition process.

SUMMARY OF THE INVENTION

It is desirable to provide a polycrystalline diamond drill insert component with lower tensile stresses and hence a lower propensity for delamination.

Therefore, it is the general object of this invention to provide a drill insert component made by sandwiching polycrystalline diamond (PCD) between a layer, preferably but not exclusively of cemented tungsten carbide, or similar hard material, and a multi-metal layer for improved interlayer bonding and a lower propensity for delamination.

Another object of this invention is to provide a drill insert component where the multi-metal layer is made of an inner layer of preferably but not exclusively niobium and an exterior layer of preferably but not exclusively molybdenum. In alternative embodiments of this invention, the multi-metal layers are selected from tantalum, zirconium, tungsten, cobalt, nickel, iron, copper, silver, gold, platinum, palladium, molybdenum, niobium, and other similar refractory metals, as well as alloys of these metals and/or intermetallic compounds containing these metals, and may be used in the form of foils, tapes, powders, and/or CVD or PVD coated metal layers.

It is a further object of this invention to provide a drill insert component using a multi-metal layer, which has an intervening layer to reduce stresses in the insert.

A further object of this invention is to provide a diamond drill insert component with an improved bond between a metal layer and the polycrystalline diamond layer.

It is another object of this invention to provide a drill insert component that reduces or eliminates detrimental, complex carbide reactions typically found in the use of certain metals.

It is a still further object of this invention to provide a drill insert component that uses a combination of materials, which create an alloying effect, thereby enabling the selection of different materials properties using the modulus of the chemistry of the metals and the thickness of the layers.

Another object of this invention to provide a drill insert component that makes use of the processing can in the composition of the drill insert component.

These and other objects and advantages of this invention are readily apparent to those of ordinary skill in the art upon careful consideration of the following drawings, detailed description, claims and abstract.

BRIEF DESCRIPTION OF THE DRAWINGS

In order to show the manner by which the above recited and other advantages and objects of the invention are obtained, a more particular description of the preferred embodiment of the invention is described as follows and is illustrated in the appended drawings. The reader should understand that the drawings depict only a preferred embodiment of the invention, and are not to be considered as limiting in scope. A brief description of the drawings is as follows.

DETAILED DESCRIPTION OF THE INVENTION

Figure 1:
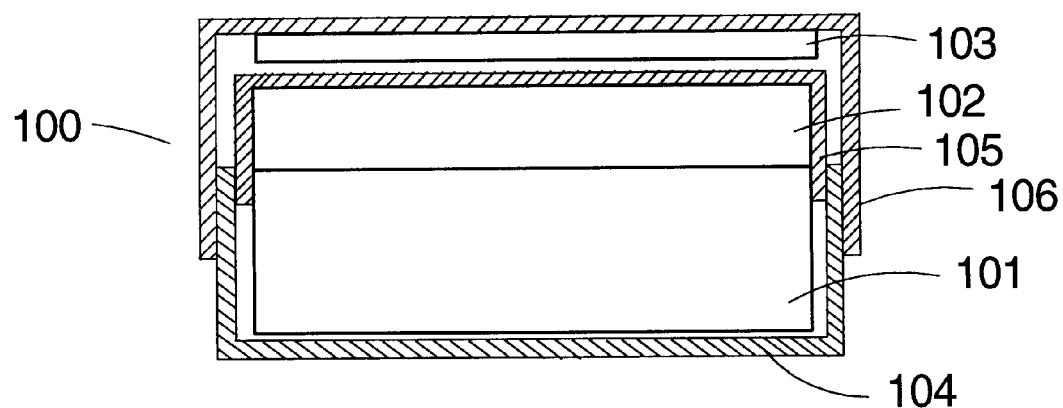
FIG. 1 is a cross-section view of a preferred manufacturing assembly for the preferred drill insert of this invention.

This invention is a new method of making drill insert components by sandwiching polycrystalline diamond (PCD) material between a layer of carbide and a layer of multi-metal material. Preferably, the multi-metal material is composed of an inner layer of niobium metal, located such that it comes in contact with the PCD material and an exterior layer of molybdenum metal. Alternatively, without departing from the concept of this invention, either layer of the multi-metal material can be selected from a metal selected from the group consisting of tantalum, zirconium, tungsten, cobalt, nickel, iron, copper, silver, gold, platinum, palladium, molybdenum, niobium, and other similar refractory metals, as well as alloys of these metals and/or intermetallic compounds containing these metals.

Niobium and niobium alloys have been found to be an ideal interface material for the PCD because it is one of the materials that is less reactive with carbon as compared to molybdenum, tungsten and other refractory metals. Niobium and its alloys are the preferred interface material because of its high interstitial solubility for carbon, nitrogen, oxygen, and hydrogen, each of which otherwise tends to be an embrittling contaminant. Using niobium, these elements, namely, carbon, nitrogen, oxygen and hydrogen, do not present such embrittling problems during fabrication of a part. Also, niobium and niobium alloys have a very low modulus, when compared to other refractory metals. Moreover, niobium is also more ductile than molybdenum, thereby assisting in the prevention of the formation of micro cracks that are due to the differential coefficient of expansion between metal layer and the PCD material after pressing. With a niobium layer adjacent to the diamond, high abrasion resistance has been observed, after being subjected to a high pressure/high temperature press, when compared to the abrasion resistance observed when using other refractory metals. Further, the propensity for delamination is low due to the excellent bonding characteristics between niobium and PCD.

The drill insert components of this invention are typically and preferably constructed using polycrystalline diamond on a cemented tungsten carbide substrate, although alternative materials, such as cubic boron nitride or other superabrasive material can be substituted for the polycrystalline diamond and titanium carbide, tantalum carbide, vanadium carbide, niobium carbide, hafnium carbide, zirconium carbide can be substituted for the cemented tungsten carbide and/or similar hard material, without departing from the concept of this invention.

The inventors intend that, for the purpose of this patent application, the term PCD or polycrystalline diamond be interpreted to mean polycrystalline diamond or any other similar superabrasive material and that the term carbide be interpreted to mean tungsten carbide, titanium carbide, tantalum carbide, vanadium carbide, niobium carbide, hafnium carbide, zirconium carbide, cemented tungsten carbide, cemented titanium carbide, cemented tantalum carbide, cemented vanadium carbide, cemented niobium carbide, cemented hafnium carbide, cemented zirconium carbide, and/or other similar material.

Referring now to the Figures and, in particular to FIG. 1, which shows the assembly 100 of the desired materials in the processing can. A mass of carbide material 101 is located in the bottom of the can 104. The preferred can bottom 104 is composed of molybdenum or other metal capable of withstanding synthesis temperatures. Placed atop the carbide material 101 is a powdered diamond mix 102. An inner can top 105 holds the diamond mix 102 atop the carbide mass 101. This inner can top 105 is composed of niobium metal and is typically and preferably approximately 0.005 inches in thickness. A molybdenum disk 103 is placed atop the inner can top 105. This molybdenum disk 103 is preferably and typically 0.015 inches in thickness. Completing the assembly is an outer can top 106. In the preferred embodiment of this invention, the outer can top 106 is composed of molybdenum, zirconium or another metal capable of withstanding synthesis temperatures.

Figure 2:
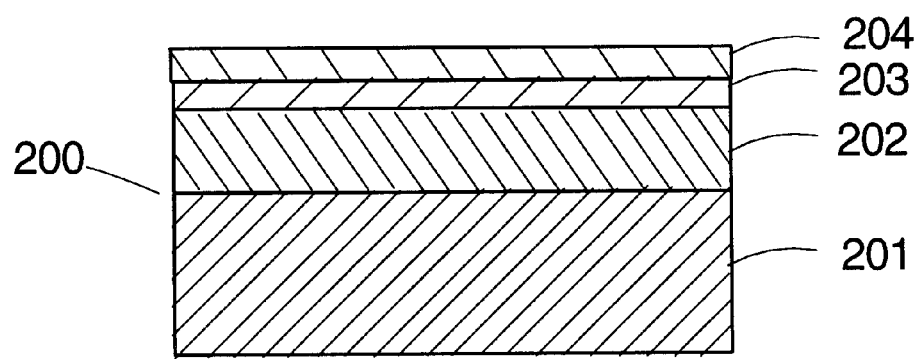
FIG. 2 is a side view of a preferred drill insert of this invention showing the preferred sandwich layers of this invention.

FIG. 2 shows the preferred sandwiched diamond insert 200 formed using the can assembly, of FIG. 1, and the method of this invention. This preferred compact 200 has a carbide layer 201, which is bonded to the PCD layer 202. The alloy layer 203 is bonded to the top surface of the PCD layer 202. This alloy layer is preferably a niobium-molybdenum alloy. The alloy layer can be engineered to a wide variety of different thickness, depending on the selected top layer. Preferably, the top layer 204 is composed of molybdenum. Upon pressing, under high pressure/high temperature sintering conditions, the various layers are bonded together forming a solid mass.

Figure 3:
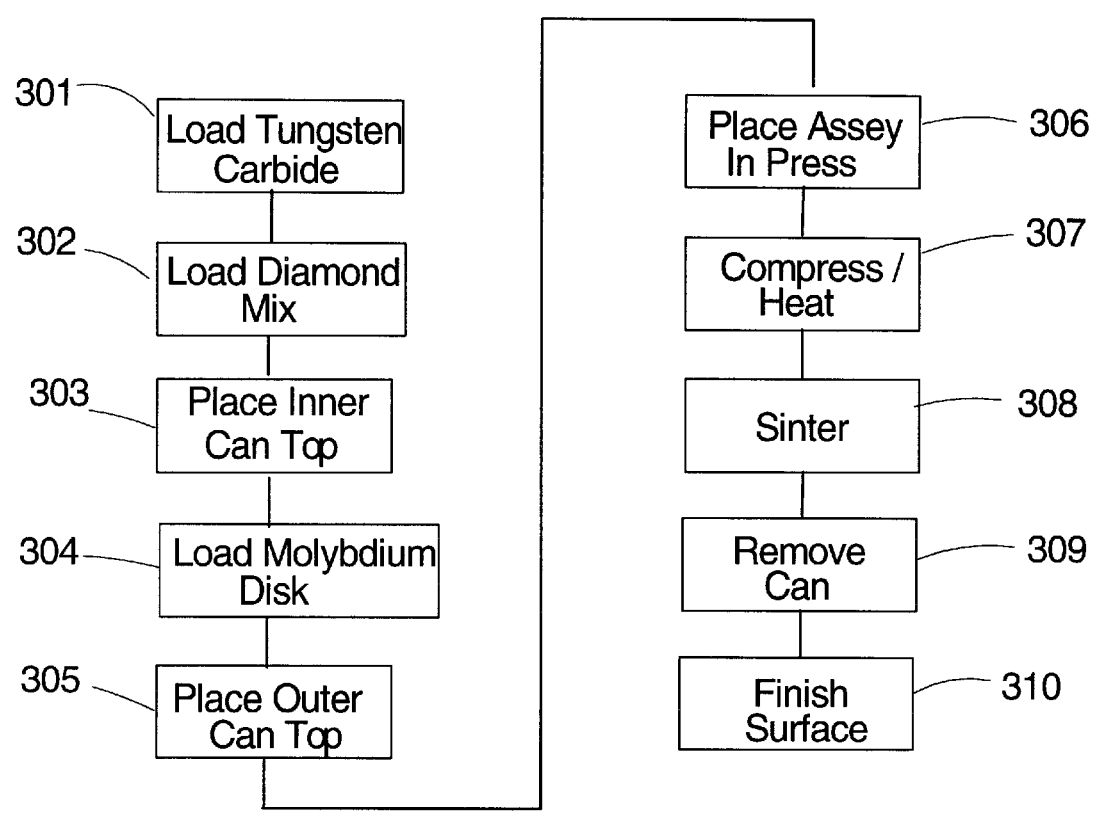
FIG. 3 is a flowchart showing the preferred steps of the method of this invention.

FIG. 3 shows the preferred steps of the method of this invention. Initially, the carbide mass 101 is loaded 301 in the can bottom 104. Polycrystalline diamond crystals 102 are then loaded 302 on the carbide mass 101. Alternatively, a precompacted tape or wafer having a super abrasive constituent can be loaded on the carbide mass 101. The inner can top 105, typically and preferably composed of niobium is placed 303 on the top of the polycrystalline diamond crystals 102. A molybdenum disk 103 is placed 304 on the top of the inner can top 105. The outer can top 106 is placed 305 over the molybdenum disk 103 and the inner can top 105 and the can bottom 104 completing the assembly 100. Next the assembly is loaded 306 in an ultra-high pressure press. A number of such assemblies can be loaded simultaneously into the ultra-high pressure press. High pressure and high temperature are applied, compressing 307 and heating the assembly. The ultra high pressure and ultra high temperature conditions cause the metal binder in the carbide substrate 101 to sweep through the diamond crystal layer 102 thereby becoming a reactive phase agent promoting the sintering of the diamond crystals to form the polycrystalline diamond structure. The molybdenum disk 103 combines with the niobium of the inner can top 105 to form a multi-metal bonded layer on the surface of the polycrystalline diamond structure 102. The assembly is removed from the press and the remaining can fragments are removed 309. The resulting drill insert component is finished 310 by such methods as grinding, EDG, chemical and laser polishing, honing, lapping, and chamfering.

We claim:

1. A drill insert for use in a twist drill bit, comprising:
   (A) a substrate having a top surface;
   (B) a layer of superabrasive material, having a first surface and a second surface, said first surface being bonded to said top surface of said substrate; and
   (C) a multi-metal layer, having a first surface and a second surface, wherein said first surface of said multi-metal layer is sintered to said second surface of said layer of superabrasive material, and wherein said second surface of said multi-metal layer is bonded to a molybdenum top layer, wherein said multi-metal layer is a single layer that further comprises an alloy of at least two metals, wherein said sintering of said multi-metal layer and said bonding of said molybdenum top layer is performed using a high pressure/high temperature press.

2. A drill insert for use in a twist drill bit, as recited in claim 1, wherein said substrate is composed of a carbide material.

3. A drill insert for use in a twist drill bit, as recited in claim 1, wherein said layer of superabrasive material is selected from the group consisting of polycrystalline diamond and cubic boron nitride.

4. A drill insert for use in a twist drill bit, as recited in claim 1, wherein said multi-metal layer alloy further comprises a first material selected from the group consisting of tantalum, zirconium, tungsten, cobalt, nickel, iron, copper, silver, gold, platinum, palladium, molybdenum, niobium.

5. A drill insert for use in a twist drill bit, as recited in claim 1, wherein said multi-metal layer alloy further comprises a second metal selected from the group consisting of tantalum, zirconium, tungsten, cobalt, nickel, iron, copper, silver, gold, platinum, palladium, molybdenum, niobium.

6. A drill insert for use in a twist drill bit, comprising:
   (A) a substrate having a top surface;
   (B) a layer of superabrasive material, having a first surface and a second surface, said first surface being bonded to said top surface of said substrate;
   (C) a multi-metal alloy layer, being a single layer and having a first surface and a second surface, said first surface of said multi-metal alloy layer sintered to said second surface of said layer of superabrasive material, wherein said sintering of said multi-metal layer is performed using a high pressure/high temperature press; and
   (D) a molybdenum top layer bonded to said second surface of said multi-metal alloy layer.

7. A drill insert for use in a twist drill bit, as recited in claim 6, wherein said multi-metal alloy layer is alloy of materials selected from the group consisting of: tantalum, zirconium, tungsten, cobalt, nickel, iron, copper, silver, gold, platinum, palladium, molybdenum, niobium.

* * * * *